(12) United States Patent
Pourdeyhimi et al.

(10) Patent No.: US 8,129,019 B2
(45) Date of Patent: Mar. 6, 2012

(54) HIGH SURFACE AREA FIBER AND TEXTILES MADE FROM THE SAME

(76) Inventors: Behnam Pourdeyhimi, Cary, NC (US); Walter Chappas, Raleigh, NC (US)

( * ) Notice: Subject to any disclaimer, the term of this patent is extended or adjusted under 35 U.S.C. 154(b) by 251 days.

(21) Appl. No.: 11/592,370

(22) Filed: Nov. 3, 2006

(65) Prior Publication Data

US 2008/0108265 A1 May 8, 2008

(51) Int. Cl.
*D02G 3/36* (2006.01)
(52) U.S. Cl. ........ 428/397; 428/364; 428/365; 428/373; 428/374; 428/401
(58) Field of Classification Search .................. 428/364, 428/365, 373, 374, 397, 401
See application file for complete search history.

(56) References Cited

U.S. PATENT DOCUMENTS

| | | | | |
|---|---|---|---|---|
| 3,853,687 A | * | 12/1974 | Ishikawa et al. | 428/373 |
| 5,611,981 A | | 3/1997 | Phillips et al. | |
| 5,855,798 A | | 1/1999 | Phillips et al. | |
| 5,922,462 A | * | 7/1999 | Kent et al. | 428/373 |
| 5,972,505 A | | 10/1999 | Phillips et al. | |
| 6,284,680 B1 | * | 9/2001 | Aikawa et al. | 442/363 |
| 6,344,595 B1 | | 2/2002 | Phillips et al. | |
| 6,450,904 B1 | * | 9/2002 | Yeh | 473/543 |
| 6,753,082 B1 | | 6/2004 | Lobovsky et al. | |
| 6,761,957 B1 | | 7/2004 | Phillips et al. | |
| 6,811,874 B2 | * | 11/2004 | Tanaka et al. | 428/370 |
| 6,855,420 B2 | | 2/2005 | Johnson et al. | |
| 2006/0135021 A1 | * | 6/2006 | Calhoun et al. | 442/364 |

FOREIGN PATENT DOCUMENTS

| | | |
|---|---|---|
| JP | 56-112535 | 9/1981 |
| JP | 58-98423 | 6/1983 |
| JP | 2-145825 | 6/1990 |
| JP | 05-239709 | 9/1993 |
| JP | 05239709 | * 9/1993 |

* cited by examiner

*Primary Examiner* — Andrew Piziali
(74) *Attorney, Agent, or Firm* — Spilman Thomas & Battle, PLLC

(57) ABSTRACT

The present invention is directed to a high surface area fiber and textiles made from the same. In one preferred embodiment the fiber has a middle region with a plurality of projections that define a plurality of channels, which increases the surface area of the fiber. In one preferred embodiment, the fiber has a specific surface area of about 140,000 cm$^2$/g or higher and a denier of about 1.0 to about 2.0. The fiber of the present invention is made using a bicomponent extrusion process using a thermoplastic polymer and a dissolvable sheath.

16 Claims, 5 Drawing Sheets

Comparison of Denier v. Specific Surface Areas Of Various Fibers

HIGH SURFACE AREA FIBER AND TEXTILES MADE FROM THE SAME

FIELD OF THE INVENTION

The present invention relates generally to high surface area fibers and textiles made from the same. Further, the present invention relates to high surface area fibers made from a bicomponent fiber extrusion process.

DESCRIPTION OF THE PRIOR ART

Fibers capable of absorbing and filtering liquids or particles are known in the art. Fiber surfaces are often treated chemically or physically to enhance their ability to hold liquids or particles. For instance, in order to increase the surface area of a fiber the surfaces are made rough to create grooves and channels. Some absorbent fibers known in the art are treated with hydrophobic or hydrophilic chemicals, which affects fluid flow.

One such fiber that is used for absorption is the 4DG fiber developed by and commercially available from Eastman Chemical Company. Referring to the drawing of FIG. 1 is a cross-sectional view of the 4DG fiber, also known as surface capillary fibers. The prior art fiber of FIG. 1 discloses one set of at least three arms that project from one side of the spine to define a first set of grooves, and a second set of at least three arms that project from a second side of the spine to define a second set of grooves. The arms and grooves of the prior art fiber have an irregular geometry so as to create grooves that are deep and narrow enough to transport fluids along the length of the fiber by capillary action. Additionally, the prior art fiber of FIG. 1 has a large denier which limits its use in certain applications for which nano-fibers are required.

The 4DG fiber seeks to increase the depth of the grooves by providing a fiber with a specific cross-sectional geometry. However, there are several disadvantages to the 4DG fiber and other fibers having a similar configuration. Many such fibers cannot be spun to fiber diameters less than about 50 to 60 microns, thereby restricting their potential applications. The minimum denier attainable with the 4DG fiber is approximately 3. Furthermore, due to the large grooves between the arms of the fiber, the arms often break during the spinning process. Such fibers have a limited number of arms and grooves resulting in a relatively low surface to volume ratio, which restricts the amount of fluid that can be absorbed. Finally, due to the size and geometry of the 4DG fiber, the arms can easily interlock during fabric formation resulting in dense and compressed materials, which diminishes its filtration and absorption properties.

There have been many attempts in the past to create special fibers with deep grooves or channels on the surface to promote surface capillary properties. Such fibers utilize multiple legs, typically 8, to form deep channels on the surface. The surface of these fibers can be treated with appropriate treatments that accommodate and facilitate fluid flow more readily and are therefore useful for fluid movement. Many of these fibers have a higher degree of bulk density and are therefore suitable for insulation applications. Since the arms can capture and trap particles, they are further useful for filtration applications or for surface treatments to activate the surface.

Fibers with surface grooves are produced using special spinnerets as single component fibers. The fibers are extruded and melted, delivering the molten polymer through spin beams and the spinneret capillaries to form the desired shape. The fibers are then quenched upon the exit from the spinneret and drawn subsequently to form a stronger and finer fiber. However, because of the deep grooves or arms of the fibers, the fibers cannot be made into normal fiber sizes that are preferred and used by the industry. Most fibers used today are between 1 and 3 denier per filament, however most fibers with the increased surface areas as discussed above are currently typically available in 6 denier or larger. Fibers with deniers of 6 or larger are extremely course, more difficult to process, and are limited in their use.

Traditional single component round fibers are commonly used in the art. The cross-sectional design of a single component round fiber is typically a circle. One problem with single component round fibers is that in order to increase the surface area of the fiber, the cross-sectional area also increases, resulting in the fiber with a large denier.

There is a need for a fiber with an increased surface area, at least 2 to 3 times the surface area of typical fibers known in the art, and with deep grooves or channels on the surface to promote surface capillary properties while maintaining a normal fiber size as used in the industry. The present invention discloses a fiber with an increased surface area and multiple surface channels, while maintaining a small denier size.

The present invention is provided to solve the problems discussed above and other problems, and to provide advantages and aspects not provided by prior fibers of this type. A full discussion of the features and advantages of the present invention is deferred to the following detailed description, which proceeds with reference to the accompanying drawings.

SUMMARY OF THE INVENTION

A first aspect of the present invention is to provide an improved high surface area fiber. The fiber has an internal fiber with a cross-section having a middle region. The middle region has a plurality of projections extending from the middle region and along the periphery of the middle region. The plurality of projections define a plurality of channels. The fiber also has an external sheath that is dissolvable. The external sheath encompasses the internal fiber.

A second aspect of the present invention is to provide an improved high surface area fiber. The fiber is has an internal fiber, in which the internal fiber is a thermoplastic polymer. The internal fiber has a cross-section with a longitudinal axis having a plurality of projections extending from the longitudinal axis. Along the periphery of the longitudinal axis, the plurality of projections define a plurality of channels. The channels have a width of about 200 nanometers to about 1000 nanometers. The external sheath is a dissolvable polymer. The external sheath encompasses the internal fiber. The internal fiber has a cross-sectional length of about 1 micrometer to about 100 micrometers, and a cross-sectional width of about 1 micrometer to about 100 micrometers. The cross-section of the internal fiber has a surface area of about 100,000 $cm^2/g$ to about 1,000,000 $cm^2/g$.

The present invention is further directed to a method for making an improved high surface area fiber, in which the steps comprise co-extruding an internal fiber and an external sheath through at least one plate. The internal fiber is a thermoplastic polymer, and the external sheath is a dissolvable polymer. The internal fiber has a cross-section with a middle region. The middle region has a plurality of projections extending from the middle region and along a periphery of the middle region. The plurality of projections define a plurality of channels. After co-extruding, the internal fiber and the external sheath are melt spun to form a bicomponent fiber. The external sheath is removed with a solvent to yield a high surface area fiber.

In one aspect of the claimed method of making the present invention, a textile product is formed before the external sheath is removed.

In another aspect of the claimed invention, an improved high surface area fiber is provided. The fiber has a cross-section having a middle region, a plurality of projections, and a plurality of channels. The plurality of projections extend from the middle region along the periphery of the middle region. The pluralities of projections define a plurality of channels. The plurality of channels are uniformly spaced.

In another aspect of the present invention, a textile product is provided. The textile product has a fiber media. The fiber media has a biocomponent fiber, in which the biocomponent fiber has an internal fiber and a dissolvable sheath.

In yet another aspect of the present invention, a textile product is provided. The textile product has a fiber media. The fiber media has a fiber, in which the fiber has a cross-section with a middle region. The middle region has a plurality of projections extending from the middle region and along the periphery of the middle region. The plurality of projections define a plurality of uniformly spaced channels.

Thus, the present invention provides a high surface area fibers made from a bicomponent extrusion process for woven and non-woven applications.

These and other aspects of the present invention will become apparent to those skilled in the art after a reading of the following description of the preferred embodiment when considered with the drawings, as they support the claimed invention.

DETAILED DESCRIPTION

Figure 1:
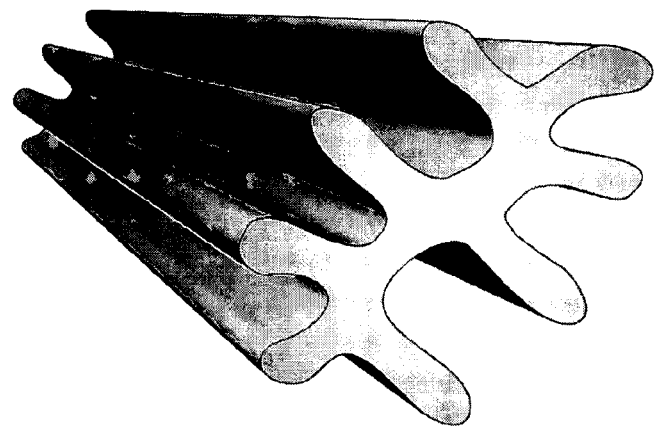
FIG. 1 is a cross-sectional perspective view of a prior art fiber.

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms. Referring now to the drawings in general, the illustrations are for the purpose of describing a preferred embodiment of the invention and are not intended to limit the invention thereto.

Figure 2:
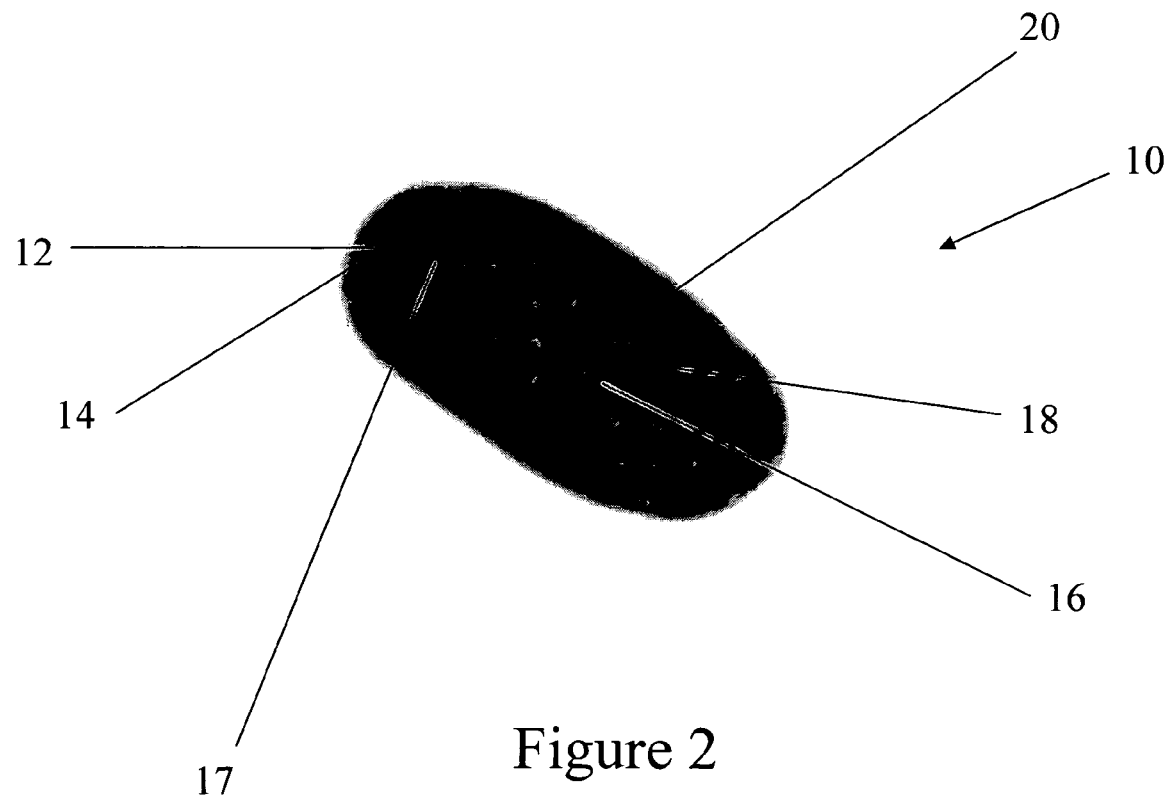
FIG. 2 is a cross-sectional view of a fiber with an external sheath, in accordance with one embodiment of the present invention.
Figure 3:
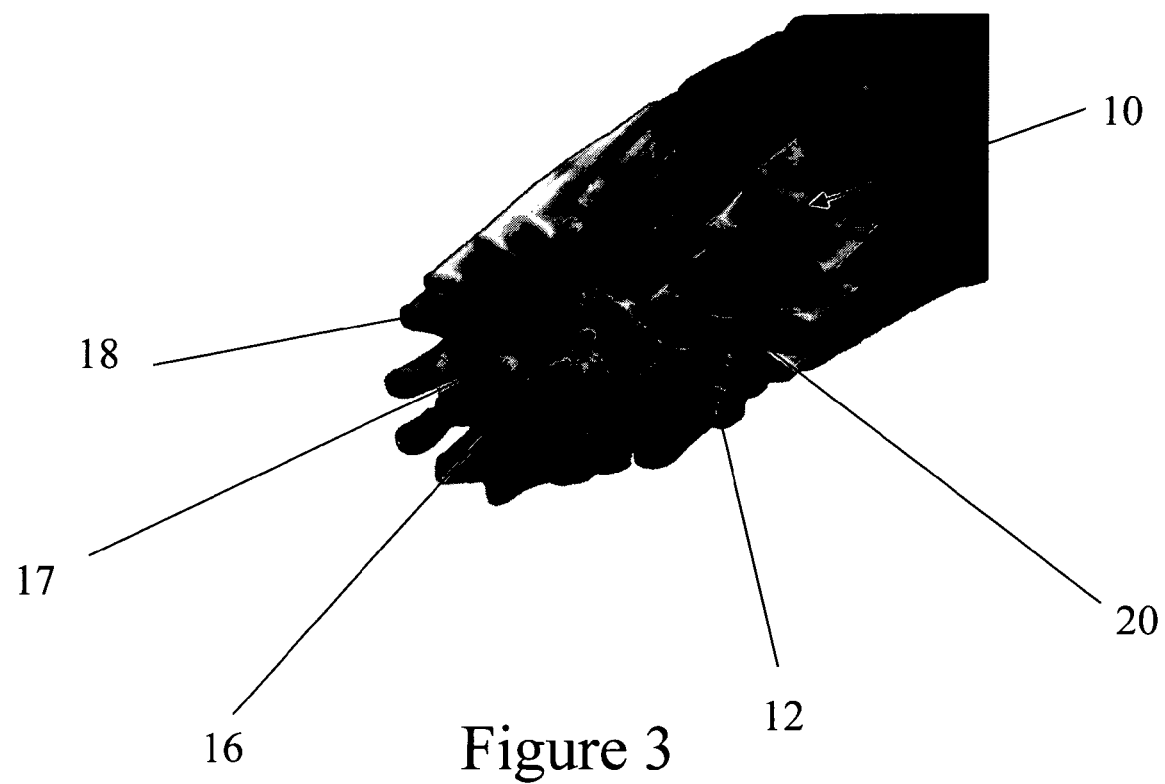
FIG. 3 is a cross-sectional view of a single fiber, in accordance with one embodiment of the present invention.
Figure 4:
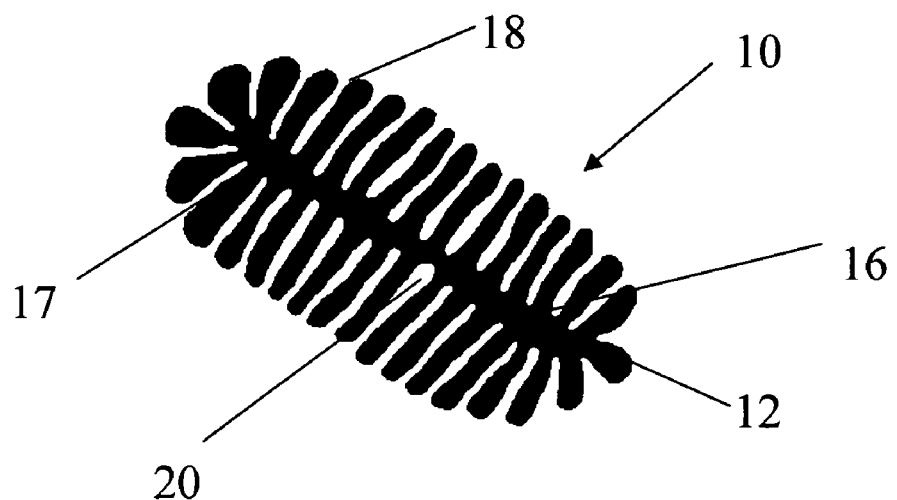
FIG. 4 is a cross-sectional view of a fiber without the external sheath, in accordance with one embodiment of the present invention.

Referring to the drawings, FIGS. 2-4 disclose a cross-section of the fiber of the present invention generally designated by the reference numeral 10. As shown in FIG. 2, the fiber 10 generally comprises an internal fiber 12 and an external sheath 14. The fiber 10 is generally constructed from two different polymer compositions that can be extruded in an oval cross-section, which allows for high processability. Alternatively, the cross-section can be circular or other shapes as desired. The extrusion process and the method of making the fiber 10 of the present invention are described in greater detail below.

As further shown in FIGS. 2-4, the cross-section of the internal fiber 12 has a generally winged-shape, or amoeba-like shape. The internal fiber 12 has a middle region 16, which is the longitudinal axis 17 that runs down the center of the internal fiber 12. The longitudinal axis 17 has a plurality of projections 18 that extend from the longitudinal axis 17, which are depicted in FIGS. 2-4. In the preferred embodiment, the plurality of projections extend along the periphery of the longitudinal axis 17. Alternative cross-sectional shapes, such as but not limited to a circular-shape or the like, would have the middle region 16 formed as a hub where the projections extend from the hub. In one embodiment, the plurality of projections are uniformly spaced. The plurality of projections 18 increase the surface areas and surface capillaries for a single fiber. In the preferred embodiment, the plurality of projections 18 define a plurality of channels 20, as shown in FIG. 4. In one embodiment, the plurality of channels 20 are uniformly spaced. The channels 20 create a surface capillary portion along the length of the fiber 10 that facilitates the absorption of liquids within the fiber 10. Additionally, the channels 20 allow particles, such as debris and dirt, to be picked-up and retained within the fiber 10. Thus, the fiber of the present invention has a plurality of longitudinal capillary channels 21 that extend along the length of the fiber as shown in FIG. 3. The present invention also drastically increases the surface area of the cross-section of the internal fiber 12 due to the plurality of projections 18. The increased surface area created by the internal fiber 12 depends on the number of segments that are used during the manufacturing of the fiber 10, which is discussed in detail below.

Preferably, the channels 20 are nano-sized, having a width of about 200 nanometers. Alternatively, the channels 20 could be between 200 nanometers to 1000 nanometers. The width of the channels 20 can be modified to fit different applications. The nano-sized channels of the present invention allow the fiber 10 to be used in applications where micro-filtration or micro-absorption is necessary. For example, certain filtration mechanisms require a channel size of about 300 nanometers. Because the channel size for each fiber can be regulated, the present invention can be used to create a textile fabric having fibers with different channel sizes. For example, a textile fabric such as a filter could comprise fiber bundles having 200 nanometer channels and 500 nanometer channels. In one embodiment if the channels have a width of about 200 nanometers there are about 32 projections 18 extending from the middle section 16.

In the preferred embodiment of the present invention, the internal fiber 12 is a thermoplastic polymer known in the art. Any number of thermoplastic polymers can be used, such as but not limited to, polypropylene, polyester, nylon, polyethylene, thermoplastic urethanes (TPU), copolyesters, or liquid crystalline polymers.

Figure 5:
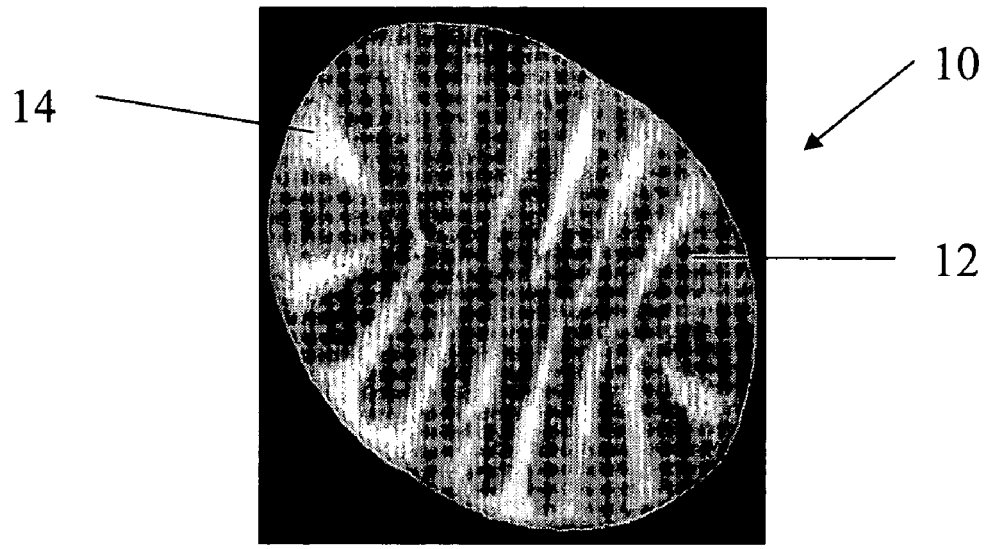
FIG. 5 is a cross-sectional view of the fiber having a circular configuration, in accordance with one embodiment of the present invention.

In the preferred embodiment the cross-section of the fiber is highly flexible and has a solid interior. Alternatively, in one embodiment, the interior, or middle region part of the internal fiber is a void. The void in the center forms an added channel for fluid flow. FIG. 5 shows a cross-section of a fiber of the present invention missing the middle region 16 of the internal fiber 12.

Alternatively, in another embodiment, the middle region 16 of the internal fiber 12 can be formed into a circular configuration during the extrusion process. This void allows the internal fiber 12 to be more rigid and have more bending resistance because of the void in the center. Additionally, the void in the center forms an added channel for fluid flow. A fiber with a circular cross section with a void will have a lower tendency to bend over itself.

FIG. 2 shows a cross-sectional view of the fiber 10 with the external sheath 14. In the preferred embodiment the external sheath 14 is a dissolvable thermoplastic, such as but not limited to, polyactide (PLA), co-polyester (PETG), polyvinyl alcohol (PVA), or ethylene-vinyl alcohol copolymer (EVOH). It is contemplated that any number of dissolvable thermoplastics known in the art may be used as the external sheath 14 in connection with the present invention. In the preferred embodiment the external sheath 14 encompasses the internal fiber 12 as shown in FIG. 2.

One aspect of the present invention is increasing the surface area of the fiber, while maintaining the denier of the fiber between 1 and 3. In the preferred embodiment, the denier of the fiber is about 1.0 to about 2.0. However, alternatively, the denier of the fiber can range from about 1.0 to about 20.0.

Figure 8:
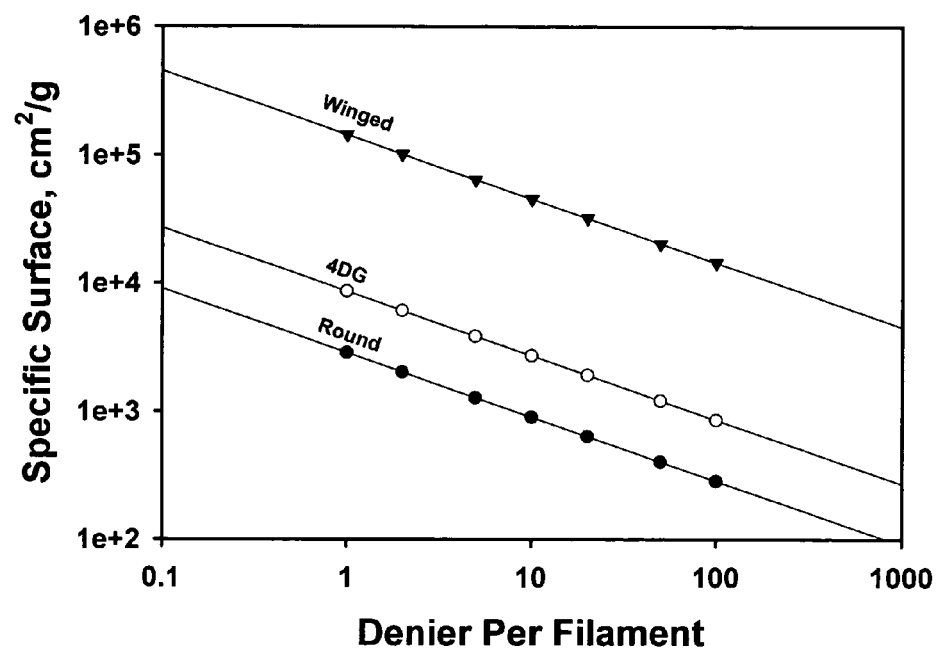
FIG. 8 is a graph comparing the denier per filament versus the specific surface areas for a round fiber, a 4DG fiber, and a fiber of the present invention.

Denier is the unit used to measure the fineness of yarns, and is equal to the mass in grams of 9,000 meters of yarn. In the preferred embodiment of the present invention, the specific surface area for a one (1) denier fiber is about 28,000 and about 200,000 cm²/g. The specific surface area in terms of cm²/g of a fiber is measured by the following equation:

$$\text{Specific Surface Area} = \alpha \sqrt{\left(\frac{4\pi L}{\rho \times \text{Denier}}\right)}$$

Where $$\alpha = \text{Shape Factor} = \frac{P^2}{4\pi A}$$

where $L = \text{Length}, K\ 9 \times 10^5\ \text{cm}$ $\rho = \text{Density}, K\ 1.38 \frac{\text{g}}{\text{cm}^3}$ $\text{Denier} = \text{Linear Density}$ $P = \text{Perimeter}$ $A = \text{Cross Sectional Area}$ The specific surface area of the preferred embodiment of the present invention is about 57-60 times greater than a typical 4DG fiber known in the art. As shown in FIG. 8, the specific surface area of a fiber of the present invention is significantly greater than a traditional round fiber or a typical 4DG fiber having the same denier. For example, a round fiber with a denier of 3 has a specific surface area of 1653 cm²/g. A 4DG fiber with a denier of 3 has a specific surface area of 4900 cm²/g. In contrast, a fiber of the present invention with a denier of 3 has a specific surface area of over about 80,000 cm²/g. In one embodiment of the present invention, the cross-section of the internal fiber has a specific surface area of about 140,000 cm²/g or higher. The present invention achieves a large specific surface area because of the unique geometry of the plurality of projections and the plurality of channels. While the preferred embodiment of the present invention has a fiber denier of about 1.0 to about 2.0, the above comparison was chosen because the 4DG fiber is not capable of being produced with a denier below 3.

In the preferred embodiment, the internal fiber 12 has a cross-sectional length of about 20 micrometers and a cross-sectional width of about 10 micrometers, which yields a fiber having a denier of about 1.5. Denier refers to the linear density of the fiber and is the weight in grams for a fiber measuring 9,000 meters. In another embodiment, the internal fiber 12 has a cross-sectional length of about 10 micrometers and the width of about 10 micrometers. The internal fiber 12 of the present invention may have a cross-sectional length of about 1 micrometer to about 100 micrometers and a cross-sectional length of about 1 micrometer to about 100 micrometers. Alternatively, in another embodiment of the present invention the fiber could have a denier of 3 or more, which would provide larger fiber with significantly large surface areas.

The method of making the fiber of the present invention uses extrusion techniques known in the art. Typically, bicomponent fibers are formed by coextruding or, extruding two polymers from the same spinneret with both polymers contained in the same filament or fiber. The extrusion process forces thick, viscous polymers through a spinneret to form semi-solid fibers. In the preferred embodiment of the present invention, the extrusion system will form the fibers as described by directing and channeling the two polymers appropriately, resulting in a more uniform shape. The number of holes on the plates correspond to the number of segments present in the fiber. These filaments are then solidified. The preferred embodiment of the present invention uses melt spinning to form the fibers, however other methods known in the art can be used. For example, a segmented pie extrusion system can be used to form fibers with projections extending from the longitudinal axis by a careful selection of the two polymers and control of the extrusion process.

The method of making the preferred embodiment begins by extruding a bicomponent fiber comprising a thermoplastic polymer, the internal fiber, and a dissolvable thermoplastic polymer, the external sheath. The bicomponent fiber is extruded through a spinneret having any number of desired holes and cross-sectional shapes. In the preferred embodiment the cross-section of the spinneret is oval for high processability, alternatively a round cross-section can also be used, or other desired shapes.

Alternatively, the final cross-sectional shape of the fiber, the winged-shape as discussed above, is determined by the number of segments formed from the extrusion process. The segments resemble pie-pieces, called a "segmented-pie" bicomponent fiber. Typical fibers of the prior art are formed from 16 segments, however in order to achieve the high surface area cross-section of the present invention, the fiber must have at least 4 segments.

In one embodiment of the present invention, the extruded bicomponent fiber has at least 4 segments. Alternatively, in another embodiment of the present invention the winged-shape cross-section of the internal fiber yields extremely high surface areas because it is formed from a bicomponent fiber having 64 segments. A caterpillar-like shape, as shown in FIGS. 2-4, was an unexpected result generated by a 64 segmented-pie extrusion. It is difficult to form a bicomponent fiber having more than 24 segments and the prior art fibers are limited in the number of segments they can have.

One way to control the shape and the size of the segments is by changing the temperature, viscosity, or pressure of the bicomponent fiber during the extrusion process. Melt spinning allows fibers to be extruded from the spinneret in different cross-sectional shapes, such as round, trilobal, pentagonal, octagonal, and other shapes. The bicomponent segments of one embodiment of the present invention resemble a segmented pie having anywhere up to 64 pie segments. In the preferred embodiment the segments alternate between the internal fiber and the dissolvable external sheath. It is important that the segments alternate because once the external sheath is washed and removed, the remaining segments define the plurality of projections that form the basis for absorption and filtration. The number of projections is directly proportional to the total surface area generated. Therefore, fibers with precise and pre-determined surfaces can be formed.

Figure 6:
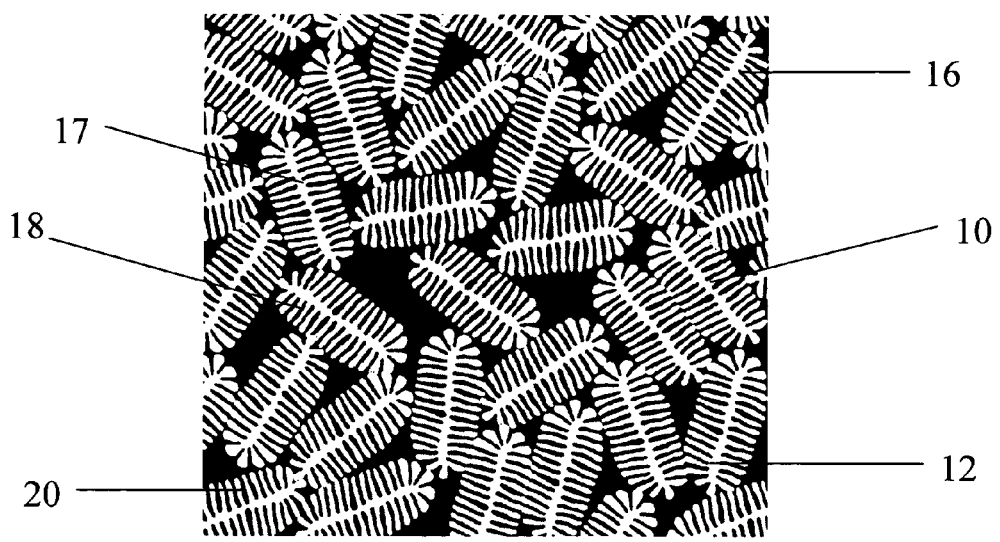
FIG. 6 is a cross-sectional view of a non-woven fabric, in accordance with one embodiment of the present invention.
Figure 7:
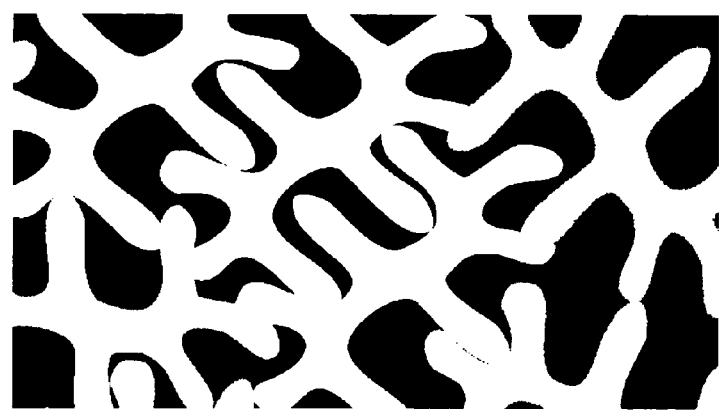
FIG. 7 is a cross-sectional view of a non-woven fabric of the prior art.

In a preferred embodiment, after the bicomponent fiber is extruded and melt spun, the bicomponent fiber can be formed into a textile product. Alternatively, the textile product comprises fiber media that is made of a bicomponent fiber. The bicomponent fiber can be bound together to form a non-woven fabric, such as a filter. Alternatively, the bicomponent fiber can be formed into a woven fabric, such as a garment. One of the advantages of the present invention is that the external sheath does not have to be removed until after the textile media is made. This enhances handling of the fiber and reduces costs associated with manufacturing. FIG. 6 shows a non-woven fabric of the present invention and illustrates how the winged-shaped fibers assemble together. As shown in FIG. 6, the fibers can be compressed closely together to form bundles without interlocking when they are placed adjacent to each other due to the geometry of the fiber and the size of the channels. Additionally, because the textile fabric can be constructed when the external sheath is still on, the sheath further prevents the fibers from interlocking with one another. FIG. 7 shows a prior art fabric in which the fibers interlock. Because the fibers of the present invention do not interlock like other fibers known in the prior art, the effectiveness of the channels of the present invention is not compromised and remains available for absorption or filtration. The external component can be removed after the final product is formed. Therefore, the fibers of the present invention and their projections cannot interlock.

Once the textile product is formed, the fabric is washed with a solvent such as, but not limited to, NaOH, acids or in the case of water dispersible polymers such as Exceval, water is used in order to remove the soluble external sheath. Alternatively, the bicomponent fiber can be washed prior to forming the textile product if desired.

In order to form the non-woven fabric of the present invention, the fibers can be bound using several different techniques including thermal, chemical, or mechanical bonding. In one embodiment, the non-woven fabric is formed using hydroentanglement, which is a mechanism used to entangle and bond fibers using hydrodynamic forces. Alternatively, non-wovens can be created by needle punching which mechanically orientates and interlocks the fibers of a spunbound or carded web. Needle punching is achieved with thousands of barbed felting needles repeatedly passing into and out of the web. Needle punching and hydroentanglement form a dense structure so that when the external sheath is removed, the wings will release in place forming a structure with high permeability. The ultimate application of the fabric will determine which bonding technique should be utilized. For example, if the non-woven fabric is to be used for filtering large particles, it can be made using spunbound fibers that are randomly interlocked fibers, but not woven. If the non-woven fabric is needed to filter smaller particles, then it can be made from melt blown fibers, which uses high velocity air or another appropriate force to bind the fibers together. Alternatively, filaments can be extruded, and said filaments can be crimped and cut into staple fibers from which a web can be formed and then bonded by one or more of the methods described above to form a nonwoven. Same staple or filament fibers can be used to form woven, knitted or braided structures as well.

In another embodiment of the present invention, staple non-woven fabrics can be constructed by spinning the bicomponent fiber and cutting the length of the fiber into short segments and put into bales. The bales are then spread in a uniform web by a wetlaid process or carding, and are subsequently bonded by thermo-mechanical means as known in the art.

The fiber of the present invention can also be used to manufacture traditional woven fabrics for use in garments and the like. Because the fibers of the present invention are strong, they can be used in traditional knitting and braiding techniques without compromising the integrity of the fiber.

Although numerous fibers are known in the art, the present invention discloses a high surface area fiber with a small denier that can be used in application for both woven and non-woven fabrics. The fibers of the present invention have higher thermal insulation capabilities than traditional fibers known in the art, and form improved filtration mediums. Furthermore, the fibers of the present invention are stronger, more flexible, and more breathable. As discussed above, because the winged-shaped fibers are compression resilient, the channels are not obstructed and have greater capillary/wicking abilities, as well as absorption capabilities. Additionally, these fibers have the ability to capture nano-sized particles. Because the fibers of the present invention are strong and have shear resistance, the fibers can withstand high pressures and can be used in liquid filtrations as well as demanding aerosol filtration applications requiring high pressure. As such, the present invention provides for a high-efficiency low-pressure drop filter constructed from woven or non-woven fabrics or fibers.

There are numerous applications of the present invention. In one example the present invention can be used in traditional woven applications, such as wicking garments, thermally insulating garments, comfort garments, sportswear and camping wear. In another example, the present invention can be used in non-woven fabrics to produce filter media to filter liquids or air for cleaning rooms. In yet another example, the present invention can be used with traditional round fibers to yield multi-layer fibers that can be combined using a spinneret or combined later in the manufacturing process. Combining or sandwiching the fibers of the present invention with traditional round fibers allows a single product to have multiple physical properties, and is cost effective.

The present invention can also be used for improved wipe materials. In typical applications wipes are primed with liquids before use, such as in baby wipes. However, the present invention allows the ability to create a wipe product that will pick up dirt and dust particles without leaving behind any particles because the liquid in the channels of the fibers remains there while still dissolving and aiding the clean-up process. Additionally, the present invention can be used for hygiene and acoustic materials, thermal insulation, geotextile materials, construction materials, and compressive performance materials such as seat cushions and mattresses.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the following claims.

What is claimed is:

1. A winged fiber, the fiber comprising:
   an internal fiber, the internal having a cross-section comprising a middle region, the middle region having between 16 projections and 32 projections extending from the middle region and along a periphery of the middle region, and a specific surface area between 100,000 cm²/g and 1,000,000 cm²/g, wherein the projections define channels, the channels having a width of between 200 nanometers and 300 nanometers; and
   an external sheath, the external sheath encompassing the internal fiber and being dissolvable.

2. The fiber of claim 1, wherein the internal fiber is a thermoplastic polymer.

3. The fiber of claim 1, wherein the channels are uniformly spaced.

4. The fiber of claim 1, where in the projections from the fiber's middle region, or longitudinal axis, defines a winged-shaped configuration.

5. The fiber of claim 1, wherein the cross-section of the internal fiber has a cross-sectional length between 1 micrometer and 100 micrometers.

6. The fiber of claim 1, wherein the cross-section of the internal fiber has a cross-sectional width between 1 micrometer and 100 micrometers.

7. The fiber of claim 1, wherein the denier is between 1.0 and 20.0.

8. The fiber of claim 7, wherein the fiber has a specific surface area of at least 140,000 cm²/g.

9. The fiber of claim 1, wherein the middle region forms a circular configuration with a void in the center.

10. The fiber of claim 1, wherein the dissolvable external sheath comprises a polyactide (PLA), a co-polyester, a polyvinyl alcohol (PVA) or an ethylene-vinyl alcohol copolymer (EVOH).

11. A winged-fiber, the fiber comprising:
    an internal fiber, the internal fiber being a thermoplastic polymer, the internal fiber having a cross-section comprising a longitudinal axis having between 16 projections and 32 projections extending from the longitudinal axis and along a periphery of the longitudinal axis, wherein the projections define channels, having a width between 200 and 300 nanometers;
    an external sheath, the external sheath being a dissolvable polymer, and the external sheath encompassing the internal fiber;
    wherein the internal fiber, has a cross-sectional length of between 1 micrometer and 100 micrometers and a cross-sectional width of between 1 micrometers and 100 micrometers; and
    wherein the internal fiber has a surface area between 100,000 cm²/g and 1,000,000 cm²/g.

12. A winged-fiber, the cross-section of the fiber comprising:
    a middle region having;
    between 16 projections and 32 projections and;
    between 16 channels and 32 channels;
    wherein the projections extend from the middle region along the periphery of the middle region; and
    wherein the projections define the channels, and wherein the channels are uniformly spaced and the channels have a channel width of between 200 nanometers and 300 nanometers.

13. A textile product comprising:
    a fiber media, wherein the fiber media comprises a bicomponent fiber, the bicomponent fiber having between 16 projections and 32 projections, wherein the projections define the channels, and the channels have a channel width of between 200 nanometers and 300 nanometers, and a dissolvable sheath.

14. The textile product of claim 13, wherein the fiber media is a non-woven material.

15. A textile product comprising:
    a fiber media, wherein the fiber media comprises a fiber, the fiber having a cross-section comprising a middle region, the middle region having between 16 projections and 32 projections extending from the middle region and along a periphery of the middle region, wherein the projections define uniformly spaced channels, and the channels have a channel width of between 200 nanometers and 300 nanometers.

16. The textile product of claim 15, wherein the fiber media is a non-woven filter media.

* * * * *